US012574925B2

(12) United States Patent
  Rahman

(10) Patent No.: US 12,574,925 B2
(45) Date of Patent: Mar. 10, 2026

(54) ENHANCED UPLINK GRANT SCHEDULING FOR USER EQUIPMENT IN 5G CELLULAR COMMUNICATION

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 356 days.

(21) Appl. No.: 18/471,961

(22) Filed: Sep. 21, 2023

(65) Prior Publication Data

US 2025/0106840 A1     Mar. 27, 2025

(51) Int. Cl.
  *H04W 72/1268*     (2023.01)
  *H04L 5/00*     (2006.01)
(52) U.S. Cl.
  CPC ....... *H04W 72/1268* (2013.01); *H04L 5/0085* (2013.01)
(58) Field of Classification Search
  CPC ......................... H04W 72/1268; H04L 5/0085
  See application file for complete search history.

(56) References Cited

U.S. PATENT DOCUMENTS

2006/0056373 A1* 3/2006 Legg ................... H04W 72/566
                                                      370/341
2020/0146024 A1* 5/2020 Gulati ................... H04W 74/08
2021/0282166 A1* 9/2021 Hawari ............. H04W 72/1268
2022/0109546 A1* 4/2022 Panteleev ............. H04L 5/0053

OTHER PUBLICATIONS

Pedersen et al., "System Level Analysis of Dynamic User-Centric Scheduling for a Flexible 5G Design", In the Proceedings of the 2016 IEEE Global Communications Conference (GLOBECOM), Dec. 2016, pp. 1-6.

* cited by examiner

*Primary Examiner* — Yaotang Wang
(74) *Attorney, Agent, or Firm* — Lee & Hayes, P.C.

(57)     ABSTRACT

Methods and systems for enhancing uplink grant scheduling in a Fifth Generation (5G) cellular communications are described herein. In some implementations, the method may comprise pre-configuring one or more resource blocks (RBs) in a radio frame for use by a plurality of user equipment (UE) to transmit data in an uplink according to a schedule. After the one or more RBs are granted, the method may further comprise monitoring the usage pattern of the one or more RBs during a time period. When some pre-granted RBs are observed to have low usage or hysteresis, the method may further comprise re-allocating the pre-granted RBs among the plurality of UE based on the usage pattern. In some implementations, one or more RBs may be pre-configured for low latency service or high quality service. The method may further include dynamically adjust the pre-granted one or more RBs based on their usage pattern.

20 Claims, 7 Drawing Sheets

500

CONFIGURE ONE OR MORE RESOURCE BLOCKS (RBs) FOR USE BY A PLURALITY OF USER EQUIPMENT (UE) TO TRANSMIT DATA IN AN UPLINK ACCORDING TO A SCHEDULE
502

ALLOCATE THE ONE OR MORE RBs TO THE PLURALITY OF UE BASED AT LEAST IN PART ON THE SCHEDULE
504

DETERMINE A USAGE PATTERN OF A FIRST RB DURING AN OBSERVING WINDOW, THE FIRST RB BEING ALLOCATED TO A FIRST UE OF THE PLURALITY OF UE
506

DETERMINE THE USAGE PATTERN OF THE FIRST RB DURING A TIME PERIOD FOLLOWING THE OBSERVING WINDOW
508

RE-ALLOCATION RECOMMENDED?
510

No

YES

KEEP THE CONFIGURATION OF THE FIRST RB
512

MODIFY THE SCHEDULE TO RE-ALLOCATE THE FIRST RB TO ANOTHER UE IN THE PLURALITY OF UE
514

500

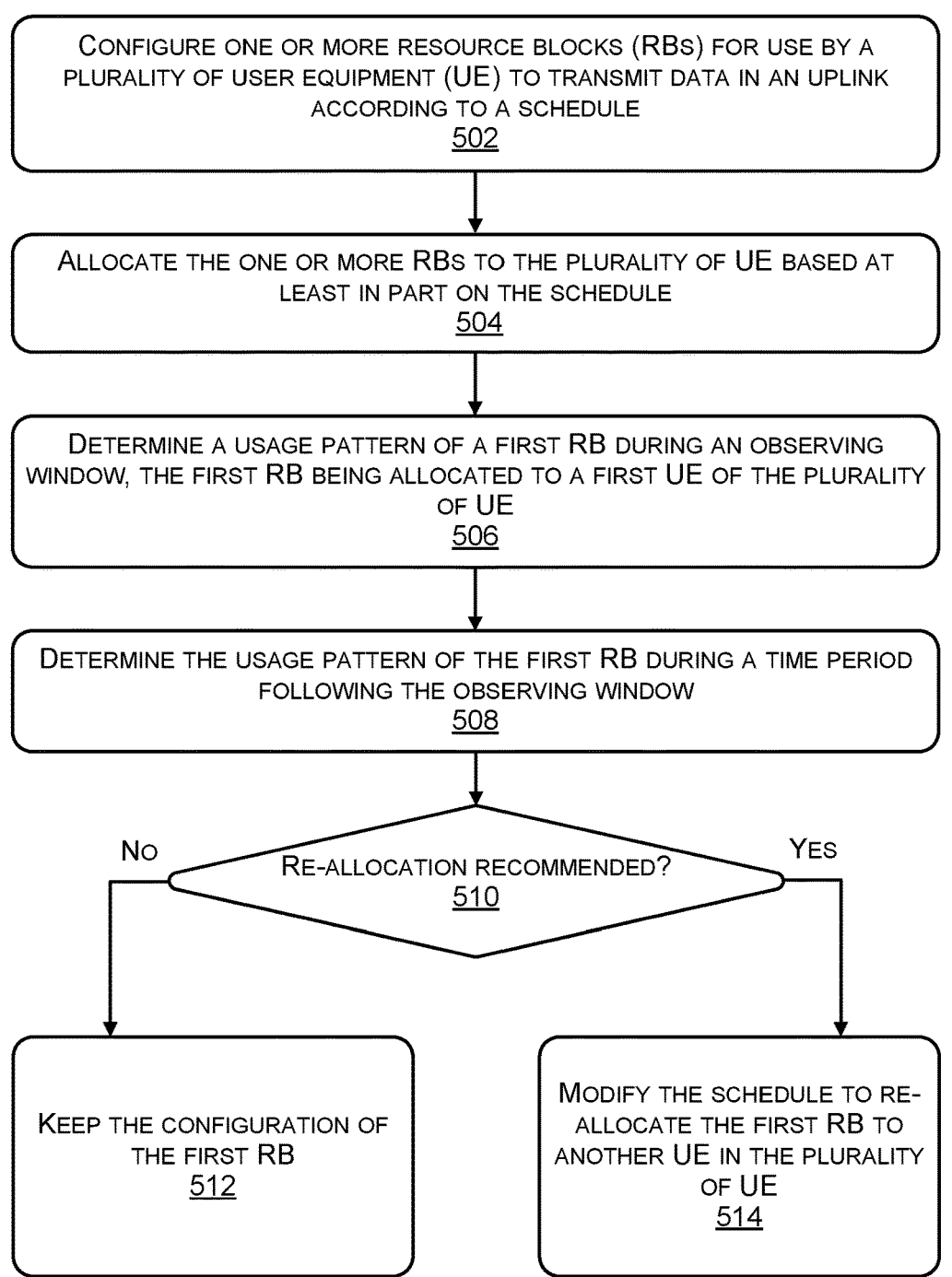

CONFIGURE ONE OR MORE RESOURCE BLOCKS (RBs) FOR USE BY A PLURALITY OF USER EQUIPMENT (UE) TO TRANSMIT DATA IN AN UPLINK ACCORDING TO A SCHEDULE
502

ALLOCATE THE ONE OR MORE RBs TO THE PLURALITY OF UE BASED AT LEAST IN PART ON THE SCHEDULE
504

DETERMINE A USAGE PATTERN OF A FIRST RB DURING AN OBSERVING WINDOW, THE FIRST RB BEING ALLOCATED TO A FIRST UE OF THE PLURALITY OF UE
506

DETERMINE THE USAGE PATTERN OF THE FIRST RB DURING A TIME PERIOD FOLLOWING THE OBSERVING WINDOW
508

RE-ALLOCATION RECOMMENDED?
510

No

YES

KEEP THE CONFIGURATION OF THE FIRST RB
512

MODIFY THE SCHEDULE TO RE-ALLOCATE THE FIRST RB TO ANOTHER UE IN THE PLURALITY OF UE
514

ENHANCED UPLINK GRANT SCHEDULING FOR USER EQUIPMENT IN 5G CELLULAR COMMUNICATION

BACKGROUND

In cellular wireless communication, a user equipment (UE) or a handset relies on the network to provide permission and resource allocation before it can send user data in an uplink (UL). The UE is advised to send a Scheduling Request (SR) to a base station of the network, e.g., eNB in 4th Generation (4G) network or gNB in 5th Generation (5G) network, to request for resource allocation to transmit user data in the uplink. The base station, in response, may assign one or more Physical Resource Blocks (PRBs) to the UE to transmit user data. The base station relies on various UL grant mechanisms such as, periodic uplink scheduling controlled by implementing specific timers and algorithms. However, according to current UL grant mechanisms, the same UL resource allocation recipe may be applied to every UE and every type of service.

Further, scheduling request followed by uplink resource allocation may take time to complete, which causes effective user perceived latency. For sensitive mission critical services, the latency may be critical. To solve the latency in uplink resource allocation, the base station may pre-group the user equipment and pre-configure the PRBs to be granted to the pre-grouped UE to transmit user data in the uplink. In another implementation, the base station may pre-configure a number of PRBs for different types of network slices that carry different types of services. For example, the based station may reserve a number of PRBs for Ultra-Reliable Low Latency Communication (URLLC). However, even though there may be some levels of distinction based on pre-grouped users, network slices, Quality of Service (QoS), multiple UE belonging to the same slice or QoS are still treated the same in UL resource grant. For services such as Vehicle to Things (V2X), Vehicle to Vehicle (V2V), smart power grid, industrial automation Internet of Things (IoT), robotics surgery, etc., under various current implementations, it is never tailored to monitor the uplink traffic pattern or hysteresis.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrate an example process for enhanced uplink grant scheduling for user equipment, according to an example of the present disclosure.

DETAILED DESCRIPTION

Figure 1:
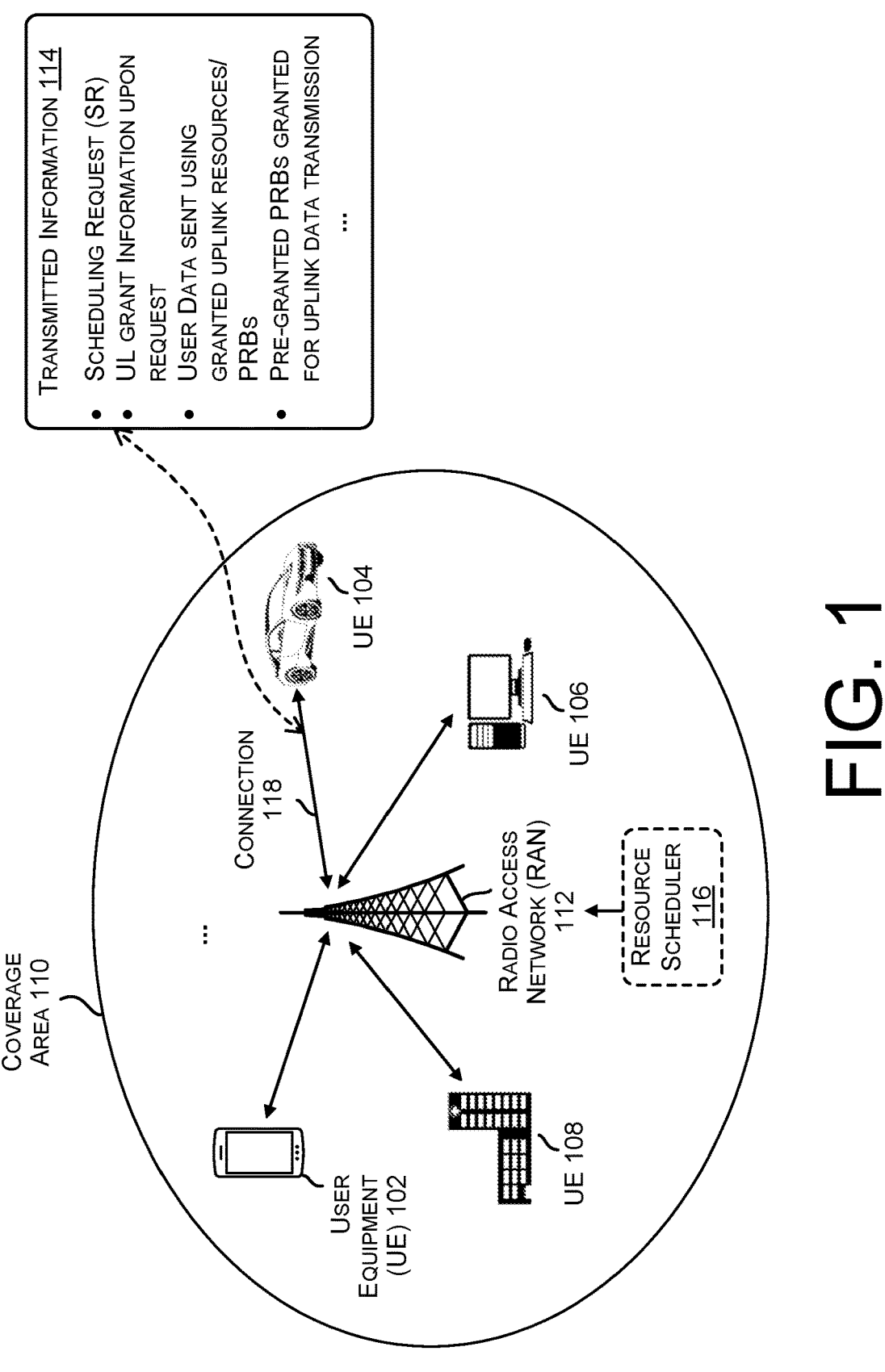
FIG. 1 illustrates an example environment, in which enhanced uplink grant scheduling for user equipment is implemented, according to an example of the present disclosure.

Techniques for enhanced uplink grant scheduling for user equipment in a 5G cellular communication, are disclosed herein.

In implementations, a computer system may pre-configure one or more resource blocks (RBs) in a radio frame for use by a plurality of user equipment (UE) to transmit data in an uplink according to a schedule. The plurality of UE may be pre-grouped based on the device characteristics, historical uplink traffic patterns, location of the UE, services subscribed by the UE, etc. The computer system may allocate the one or more RBs to the plurality of UE based at least in part on the schedule. In some examples, the schedule may indicate the frequency range in frequency domain and a number of slots in time domain of the one or more RBs pre-granted to each of the plurality of UE.

In implementations, after the one or more RBs are granted, the computer system may monitor the usage of the one or more RBs during a time period an modify the schedule to re-allocate the one or more RBs to the plurality of UE based at least in part on the usage. In some examples, the computer system may determine whether the usage of a particular RB pre-granted to a particular UE is low during the time period. In some instances, the usage of the particular RB may also demonstrate hysteresis in implementation. When the usage of the particular RB is low during the time period and/or demonstrates hysterics, the computer system may re-allocate the particular RB to another UE in the plurality of UE.

In implementations, for a particular RB, the computer system may determine a number of resource elements (REs) that actually carry data uplink data transmission to determine the usage of the particular RB during the time period. In some examples, the computer systems may further determine the distribution of the number of REs that are used for uplink data transmission in frequency domain and time domain.

In implementations, the computer system may determine the usage of the particular RB is low during an observing time window (e.g., a short time period) and track the usage of the particular RB during the time period following the observing time window (e.g., one or more days). The computer system may determine that the usage of the particular RB during the time period is low or less than a threshold.

In some implementations, a computer system may pre-configure one or more RBs for the use of a plurality of network services. Particularly, the computer system may pre-grant a number of RBs for low latency services such as URLLC. The computer system may allocate the one or more RBs to the network slices through which, the plurality of network services are provided, respectively. After the one or more RBs are granted, the computer system may determine usage of the one or more RBs during a time period and re-allocate the one or more RBs among the plurality of network services based at least in part on the usage. In some examples, the computer system may adjust a percentage of the RBs allocated to a particular network service used by a particular UE.

According to the present disclosure, the usage pattern and/or hysteresis of the uplink granted resources (e.g., PRBs) are constantly monitored. The observed usage pattern and/or hysteresis is supplemented to existing resource scheduling logic. Thus, the base station (e.g., eNodeB or gNodeB) can dynamically allocate the resources to various UE camped under it. Further, uplink resources can also be re-allocated among various levels of services used by the UE. The present disclosure, thus, can improve the latency in the uplink data transmission, reduce interference in the uplink, and boost user experience on uplink traffic flow.

The techniques discussed herein may be implemented in a computer network using one or more of protocols including but are not limited to Ethernet, $3^{rd}$ generation (3G), 4G, long term evolution (LTE), 5G, $6^{th}$ generation (6G), the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example environment 100, in which enhanced uplink grant scheduling for user equipment is implemented, according to an example of the present disclosure.

As illustrated, environment 100 may include a plurality of user equipment (UE) such as, UE 102, UE 104, UE 106, and UE 108. The terms "user equipment (UE)," "user device," "wireless communication device," "wireless device," "communication device," "mobile device," and "client device," can be used interchangeably to describe any UE (e.g., UE 102, UE 104, UE 106, and/or UE 108) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., UE 102, UE 104, UE 106, and/or UE 108) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network. Yet additional examples of UEs include, but are not limited to, computing devices associated with vehicles, autonomous vehicles, smart power grid, computing devices associated with industrial automation, computing devices associated with robotics surgery system (e.g., Da Vinci Robotic Surgical Systems) that can generate, request, receive, transmit, or exchange voice, video, and/or digital data over a network.

Any of UE 102, UE 104, UE 106, and UE 108 may be capable of supporting 4G radio communications, such as LTE radio communications, and 5G radio communications, such as New Radio (NR) communications. In some examples, one or more of UE 102, UE 104, UE 106, or UE 108 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

Environment 100 further includes a Radio Access Network (RAN) 112 associated with a coverage area 110. The terms "RAN," "base station," "Access Point (AP)," or their equivalents, can refer to one or more devices that can transmit and/or receive wireless services to and from one or more UEs in a coverage area. For example, a RAN can be implemented as a variety of technologies to provide wired and/or wireless access to the network, as discussed herein. In some instances, a RAN can include a 3rd Generation Partnership Project (3GPP) RAN, such a GSM/EDGE RAN (GERAN), a Universal Terrestrial RAN (UTRAN); and/or an Evolved UTRAN (E-UTRAN), or alternatively, a "non-3GPP" RAN, such as a Wi-Fi RAN, or another type of wireless local area network (WLAN) that is based on the IEEE 802.11 standards. Further, a RAN can include any number and type of transceivers and/or base stations representing any number and type of macrocells, microcells, picocells, or femtocells, for example, with any type or amount of overlapping coverage or mutually exclusive coverage.

In particular implementations, the coverage area 110 can correspond to a geographic region where wireless communications are supported by the RAN 112. For example, the coverage area 110 is a region where the RAN 112 can transmit and/or receive data wirelessly with other devices.

The RAN 112 may be capable of transmitting and/or receiving data wirelessly using at least one radio technology. As used herein, the term "radio technology" can refer to a type, technique, specification, or protocol by which data is transmitted wirelessly. In some cases, a radio technology can specify which frequency bands are utilized to transmit data. For instance, a "5G radio technology" can refer to the NR standard, as defined by 3GPP. In some cases, a "4G radio technology" can refer to the LTE radio standard, as defined by 3GPP.

In some examples, the RAN 112 may utilize a 4G radio technology. The RAN 112 may transmit and receive data with a device located in the coverage area 110 over at least one LTE radio link that is defined according to frequency bands included in, but not limited to, a range of 450 MHz to 5.9 GHz. In some instances, the frequency bands utilized for the LTE radio link(s) by the RAN 112 can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE band 48 (e.g., 3500 MHz), LTE Band 50 (1500 MHz), LTE Band 51 (1500 MHz), LTE Band 66 (1700 MHz), LTE Band 70 (2000 MHz), LTE Band 71 (e.g., a 600 MHz band), LTE Band 74 (1500 MHz), and the like. In some examples, the RAN 112 can be, or at least include, an eNodeB that can connect to devices in the coverage area 110 via the LTE radio link(s).

In some instances, the RAN 112 may also utilize a 5G radio technology, such as technology specified in the 5G NR standard, as defined by 3GPP. In certain implementations, the RAN 112 can transmit and receive communications with devices located in the coverage area 110 over at least one NR radio link that is defined according to frequency resources including "millimeter wave" bands including, but not limited to 26 GHz, 28 GHz, 39 GHz, 60 GHz, and the like. In some embodiments, the RAN 112 can be, or at least include, a gNodeB that can connect to devices in the coverage area 110 via the NR radio link(s).

In some implementations, the RAN 112 is part of a Non-Standalone (NSA) architecture. For instance, the RAN 112 may include both a 4G transceiver (e.g., an eNodeB) by which the RAN 112 can establish LTE radio link(s) and a 5G transceiver (e.g., a gNodeB) by which the RAN 112 can establish NR radio link(s). In some cases, functions (e.g., transmission intervals, transmission power, etc.) of the 4G transceiver and the 5G transceiver are coordinated by the RAN 112.

According to various implementations, the RAN 112 may communicate with a core network (not illustrated) that can include a 4G core network (e.g., an Evolved Packet Core (EPC)) and/or a 5G core network. Services may be relayed between the core network(s) and a device in the coverage area 110 by the RAN 112 via the LTE radio link(s) and/or the NR radio link(s). In some cases, the core network can provide the services, in turn, to and from at least one Wide Area Network (WAN) (such as the Internet), an Internet Protocol (IP) Media Subsystem (IMS) network, and the like. In various implementations, the services can include voice services, data services, and the like.

As illustrated in FIG. 1, each of UE 102, UE 104, UE 106, and UE 108 are located in the coverage area 110. Accordingly, each of UE 102, UE 104, UE 106, and UE 108 may be capable of transmitting and/or receiving data with the RAN 112 via the LTE radio link(s) and/or the NR radio link(s). In various implementations, data can be exchanged between the RAN 112 and each of UE 102, UE 104, UE 106, and UE 108 via the LTE radio technology using the LTE radio link(s) and/or the NR radio technology using the NR radio link(s) (e.g., data 114 exchanged between RAN 112 and UE 104 via connection 118). In particular implementations, each of UE 102, UE 104, UE 106, and UE 108 may establish a connectivity mode with the RAN 112 among a dual connectivity mode, in which both the LTE radio link(s) and the NR radio link(s) are used to exchange data; a single connectivity mode utilizing the LTE radio link(s) to exchange data without utilizing the NR radio link(s); and a single connectivity mode utilizing the NR radio link(s) to exchange data without the LTE radio link(s).

In some examples, the environment 100 may further include a resource scheduler 116 implemented or cooperatively coupled to RAN 112 to schedule UL resource granting for the UE (e.g., UE 102, UE 104, UE 106, and UE 108). In some instances, the resource schedule 116 may be implemented on an eNodeB of the 4G/LTE network. In some other instances, the resource schedule 116 may be implemented on a gNodeB of the 5G network. As discussed herein, a resource block (e.g., physical resource block—PRB) is a block of 12 frequency subcarriers, over which the data transmissions are scheduled for multiple UE (e.g., UE 102, UE 104, UE 106, and UE 108). In some examples, when the LTE radio link(s) are utilized, the PRB is made up of 12 consecutive subcarriers for a duration of one slot (e.g., 0.5 ms). In yet other examples, when the NR radio link(s) are utilized, the PRB may define the frequency domain to be made up of 12 subcarriers with the spacing between the subcarriers determined based on the numerology.

The numerology, as a 5G parameter denoted as, ranges from 0 to 5. The subcarrier spacing (SCS) can be any value of 15 KHz, 30 KHz, 60 KHz, 120 KHz, 240 KHz, and 480 KHz, depending on the numerology. For $\mu=0$, SCS of 15 KHz is used, and one RB is 180 KHz (i.e., 15×12) in frequency domain and 1 ms in time domain with a normal CP length. For $\mu=1$, SCS of 30 KHz is used, and one RB is 360 KHz (i.e., 30×12) in frequency domain and 0.5 ms in time domain with a normal CP length. For $\mu=2$, SCS of 60 KHz is used, and one RB is 720 KHz (i.e., 60×12) in frequency domain and 0.25 ms in time domain with a normal CP length. For $\mu=3$, SCS of 120 KHz is used, and one RB is 1440 KHz (i.e., 120×12) in frequency domain and 0.125 ms in time domain with a normal CP length. For $\mu=4$, SCS of 240 KHz is used, and one RB is 2880 KHz (i.e., 240×12) in frequency domain and 0.0625 ms in time domain with a normal CP length. Each numerology may also define a minimum number and a maximum number of RBs. For each numerology, the minimum and maximum 5G NR channel bandwidth can be calculated using the RB bandwidth and the minimum number and a maximum number of RBs.

In some examples, data exchanged on connection established between RAN 112 and UE (e.g., data 114 exchanged on connection 118 established between RAN 112 and UE 104) may include, but is not limited to, Scheduling Request (SR) transmitted from UE 104 to RAN 112, uplink (UL) grant information (e.g., PRBs) transmitted from RAN 112 to UE 104, user data transmitted from UE 104 to RAN 112 using the granted UL resources/PRBs, UL resources/PRBs pre-granted to UE 104, etc. For regular services, the UE may send the SR to RAN 112 to request resources (e.g., PRBs) to transmit data in the uplink. In response, the RAN 112 grants a certain number of PRBs to the UE. The certain number of PRBs may span one or more frequency subcarriers continuously or non-continuously. In some particular examples, the resource scheduler 116 may pre-configure the PRBs to be allocated to a group of UE to transmit data in the uplink according to a schedule. In yet some other examples, the resource scheduler 116 may pre-allocate a portion of PRBs to transmit data in the uplink in a particular network slice corresponding to a particular type of service, e.g., the Ultra-Reliable Low Latency communication (URLLC) service. In yet some other examples, the resource scheduler 116 may pre-allocate a portion of the PRBs to transmit data in the uplink for services with a particular QoS requirement, e.g., delay critical Guaranteed Bit Rate (GBR) service.

In some examples, for pre-configured UL PRBs, the resource scheduler 116 may track the usage of these pre-configured PRBs after they are allocated to the respective UE. Alternatively or additionally, the resource scheduler 116 may track the usage of these pre-configured PRBs after they are allocated for a particular type of service (e.g., URLLC service or delay critical GBR service). If the preconfigured PRBs are observed to be not fully utilized in a preset time period and/or have hysteresis in implementation, the resource scheduler 116 may re-allocate the PRBs that are not fully utilized to other UE. Alternatively or additionally, the resource scheduler 116 may adjust the percentages of PRBs allocated to various network slices corresponding to various services, or the percentages of PRBs allocated to various QoS services.

By monitoring the usage pattern and/or hysteresis of the uplink granted resources (e.g., PRBs) and implementing the observed usage pattern and/or hysteresis to existing resource scheduling logic, the base station (e.g., eNodeB or gNodeB) can dynamically allocate the resources to various UE camped under it. The present disclosure, thus, can improve the latency in the uplink, reduce interference in the uplink, and boost user experience on uplink traffic flow.

Figure 2:
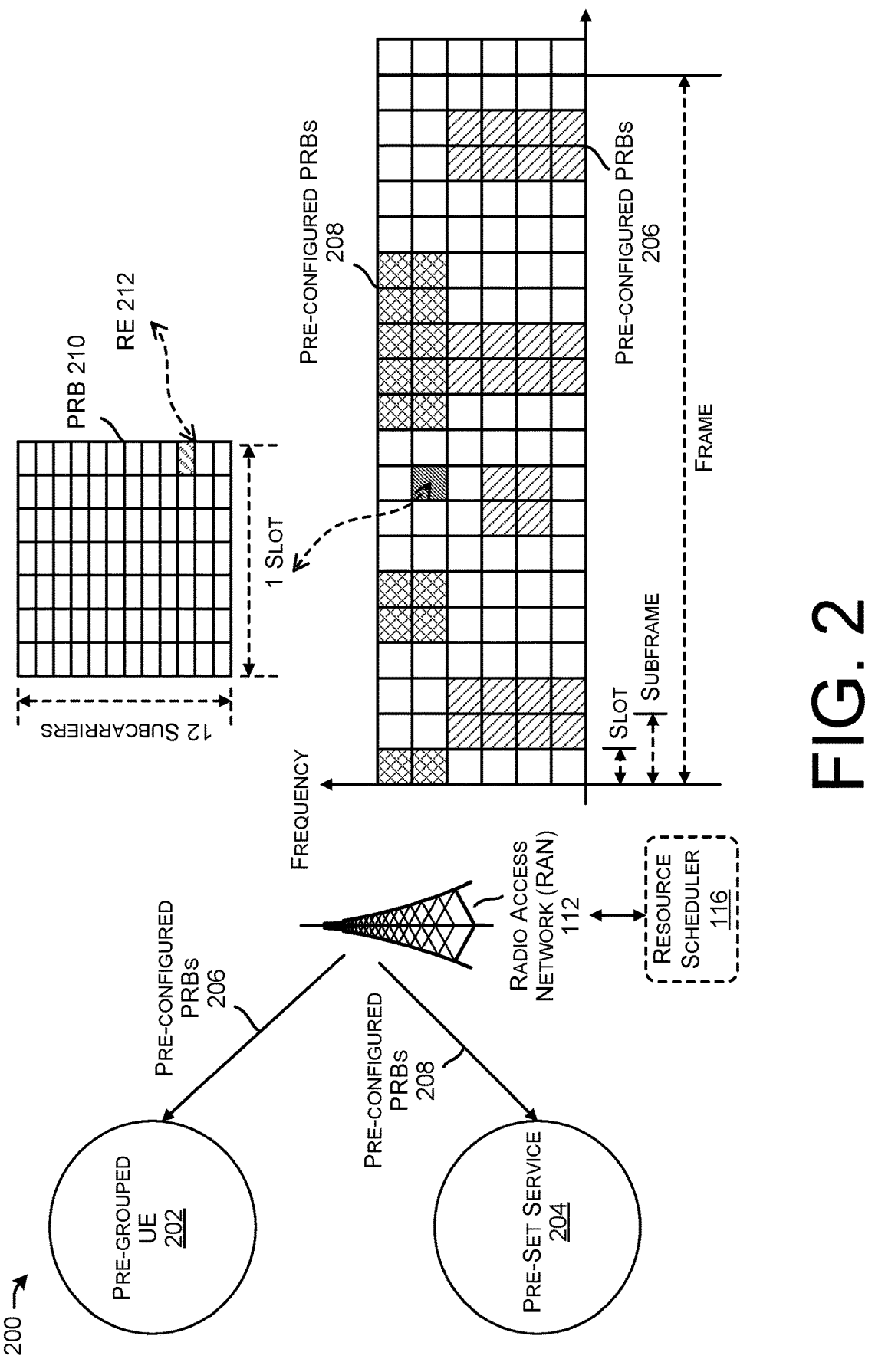
FIG. 2 illustrates example uplink grant scheduling for user equipment, according to an example of the present disclosure.

FIG. 2 illustrates an example scenario 200 for uplink grant scheduling for user equipment, according to an example of the present disclosure.

As illustrated in FIG. 2, the RAN 112 may allocate pre-configured PRBs 206 to a pre-grouped UE 202. In some examples, the RAN may allocate pre-configured PRBs 208 to a pre-set service 204. Although the pre-grouped UE 202 and the pre-set service 204 are illustrated separately in FIG. 2, the pre-configured PRBs 208 may be implemented in combination with the pre-configured PRBs 206. In some examples, the pre-configured PRBs 208 may be a portion of the pre-configured PRBs 206 allocated to a particular UE of the pre-grouped UE 202. In some instances, the pre-set service 204 may be a low latency service (e.g., URLLC). The RAN 112 may designate 30% of the pre-configured PRBs 206 to the pre-configured PRBs 208 to be allocated to any UE to transmit data when the UE is using the pre-set service 204. In implementations, the pre-configured PRBs 208 may be granted to a network slice established between the UE and the network to transmit data corresponding to the pre-set service 204. In some examples, the RAN 112 may designate multiple percentages of the pre-configured PRBs 206 to be used by network slices corresponding to multiple services (e.g., URLLC, eMBB, eMTC, public safety, etc.). As discussed herein, the PRBs may be pre-configured and allocated by the resource scheduler 116 implemented on or cooperatively coupled to the RAN 112.

In implementations, various UE may be pre-grouped together based on one or more characteristics associated with the device. In some examples, UE that support the same frequency band may be pre-grouped together (e.g., Samsung Galaxy A54 5G or iPhone 13 pro registered through T-Mobile). In some other examples, UE that locate in a same area may be pre-grouped together (e.g., UE that are located within a medical center during work time, computing devices located within an industrial campus, etc.). In yet other examples, same particular types of UE may be pre-grouped together (e.g., vehicles, autonomous vehicles, smart power grid, robotics systems, etc.). In some implementations, various Ultra-Reliable Low Latency Communication (URLLC) service such as vehicle to things (V2X), vehicle to vehicle (V2V), robot surgery systems, smart power grid, industrial automation IoT, etc., may be pre-allocated with a number of PRBs to transmit data in the uplink.

In some examples, the RAN 112 may utilize the 4G radio technology to transmit and receive data from the pre-grouped UE. Accordingly, each of the pre-configured PRBs 206 and the pre-configured PRBs 208 is made up of 12 consecutive subcarriers for a duration of one slot (e.g., 0.5 ms). As shown in FIG. 2, a PRB 210 may occupy 12 subcarriers and 7 Orthogonal Frequency Division Multiplexing (OFDM) symbols when a slot has a normal Cyclic Prefix (CP) length. In some instances, the PRB 210 may occupy 12 subcarriers and 6 OFDM symbols when a slot has an extended CP length (not shown). Each element in the PRB 210 made up of one subcarrier in frequency domain and one symbol in time domain is referred to as a resource element (RE), e.g., RE 212. In some instances, the RAN 112 may also utilize a 5G radio technology. Accordingly, each of the pre-configured PRBs 206 and the pre-configured PRBs 208 is made up of 12 consecutive subcarriers with a spacing between the subcarriers based on the numerology. As discussed herein, the subcarrier spacing (SCS) can be any value of 15 KHz, 30 KHz, 60 KHz, 120 KHz, 240 KHz, and 480 KHz, depending on the numerology. The bandwidth of one RB also varies depending on the numerology. For instance, for $\mu=0$, SCS of 15 KHz is used, and one RB is 180 KHz in frequency domain and 1 ms in time domain with a normal CP length, for $\mu=1$, SCS of 30 KHz is used, and one RB is 360 KHz in frequency domain and 0.5 ms in time domain with a normal CP length, etc.

As illustrated in FIG. 2, a frame (e.g., a radio frame in 5G) with a length of 10 ms may include 10 subframes of a length of 1 ms. Each subframe may include 2 slots. The pre-configured PRBs 206 or the pre-configured PRBs 208 may occupy one or more frequency ranges and one or more slots. In some instances, the one or more frequency ranges allocated to the pre-configured PRBs 206 or the pre-configured PRBs 208 may be continuous. In some instances, the one or more slots allocated to the pre-configured PRBs 206 or the pre-configured PRBs 208 may be adjacent. In yet other examples, the one or more frequency ranges and the one or more slots allocated to the pre-configured PRBs 206 or the pre-configured PRBs 208 may not be continuous or adjacent.

It should be appreciated that the example radio frame and the RBs in FIG. 2 are for illustration purposes. The present disclosure is not intended to be limiting. The number of slots per subframe and per frame may vary depending on the numerology.

Figure 3:
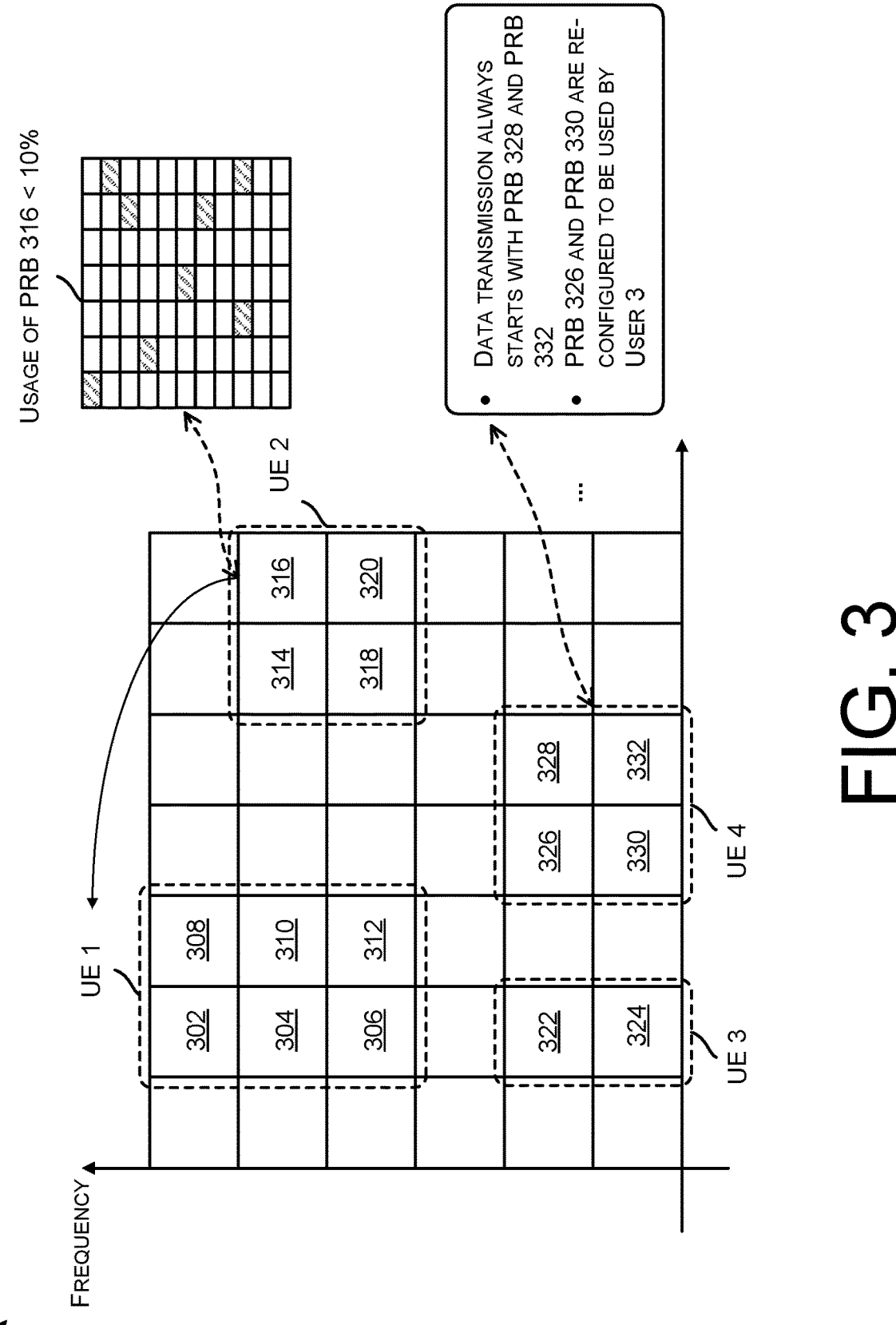
FIG. 3 illustrates example uplink grant scheduling for user equipment, according to another example of the present disclosure.

FIG. 3 illustrates an example scenario 300 for uplink grant scheduling for user equipment, according to another example of the present disclosure.

The example scenario 300 illustrates an uplink grant scheduling for pre-grouped UE (e.g., UE 1, UE 2, UE3, and UE 4). As illustrated in FIG. 3, PRB 302, PRB 304, PRB 306, PRB 308, PRB 310, and PRB 312 may be pre-granted to UE 1. PRB 314, PRB 316, PRB 318, and PRB 320 may be pre-granted to UE2. PRB 322 and PRB 324 may be pre-granted to UE 3. PRB 326, PRB 328, PRB 330, and PRB 332 may be pre-granted to UE 4. In some implementations, after these pre-granted PRBs are allocated to the corresponding UE, the network (e.g., the RAN 112 and/or the resource scheduler 116) may track the usage of each pre-granted PRB (e.g., PRB 302, PRB 304, PRB 306, PRB 308, PRB 310, PRB 312, PRB 314, PRB 316, PRB 318, PRB 320, PRB 322, PRB 324, PRB 326, PRB 328, PRB 330, and PRB 332). In some examples, for each pre-granted PRB, the network may monitor the usage of the pre-granted PRB in an observing time window. In some instances, the observing time window may be a short time period, e.g., any value within one hour, e.g., 5 minutes, 10 minutes, or 30 minutes. If the usage of the pre-granted PRB is low in the observing time window, the network may track the usage of the pre-granted PRB in a time period longer than the observing time window. In some implementations, the time period may be set as one entire day.

In some implementations, for each pre-granted PRB, the network may track the number of resource elements (e.g., RE 212 shown in FIG. 2) used to carry data transmission during the observing time window (e.g., in 10 minutes) and/or during the time period (e.g., during the day). As illustrated in FIG. 3, for PRB 316 pre-granted to UE 2, it is observed that less than 10% of REs carry data transmission during the observing time window. The network may then continue to monitor the usage of PRB 316 pre-granted to UE 2 for an entire day. If the usage of PRB 316 is observed to be low for the entire day, the network may determine that PRB 316 pre-granted to UE 2 could be granted to other UE instead (e.g., UE 1) to transmit data in the uplink. In some examples, a usage threshold may be applied to determine whether the pre-granted PRB re-allocation is recommended.

In some examples, the network may observe hysteresis in implementing a pre-granted PRB for uplink data transmission. For example, the network may observe that data transmission for UE 4 may always start with PRB 328 and PRB 332, leaving PRB 326 and PRB 330 barely used. If the observed hysteresis continues for one day, the network may determine that PRB 326 and PRB 330 pre-granted to UE 4 could be granted to other UE instead (e.g., UE 3) to transmit data in the uplink. Based at least in part on the observed usage pattern (e.g., usage and/or hysteresis) of the pre-granted PRBs, the RAN 112 and/or the resource scheduler 116 may re-allocate the pre-granted PRBs (e.g., PRB 302, PRB 304, PRB 306, PRB 308, PRB 310, and PRB 312 pre-granted to UE 1, PRB 314, PRB 316, PRB 318, and PRB 320 pre-granted to UE2, PRB 322 and PRB 324 pre-granted to UE 3, and PRB 326, PRB 328, PRB 330, and PRB 332 pre-granted to UE 4). In some examples, the re-allocation of the pre-granted PRBs may be implemented during a certain time of the day such that the impact on user experience is minimum (e.g., during nighttime). The RAN 112 and/or the resource scheduler 116 may implement the re-allocated PRBs by flushing the memory associated therewith during the nighttime.

Figure 4:
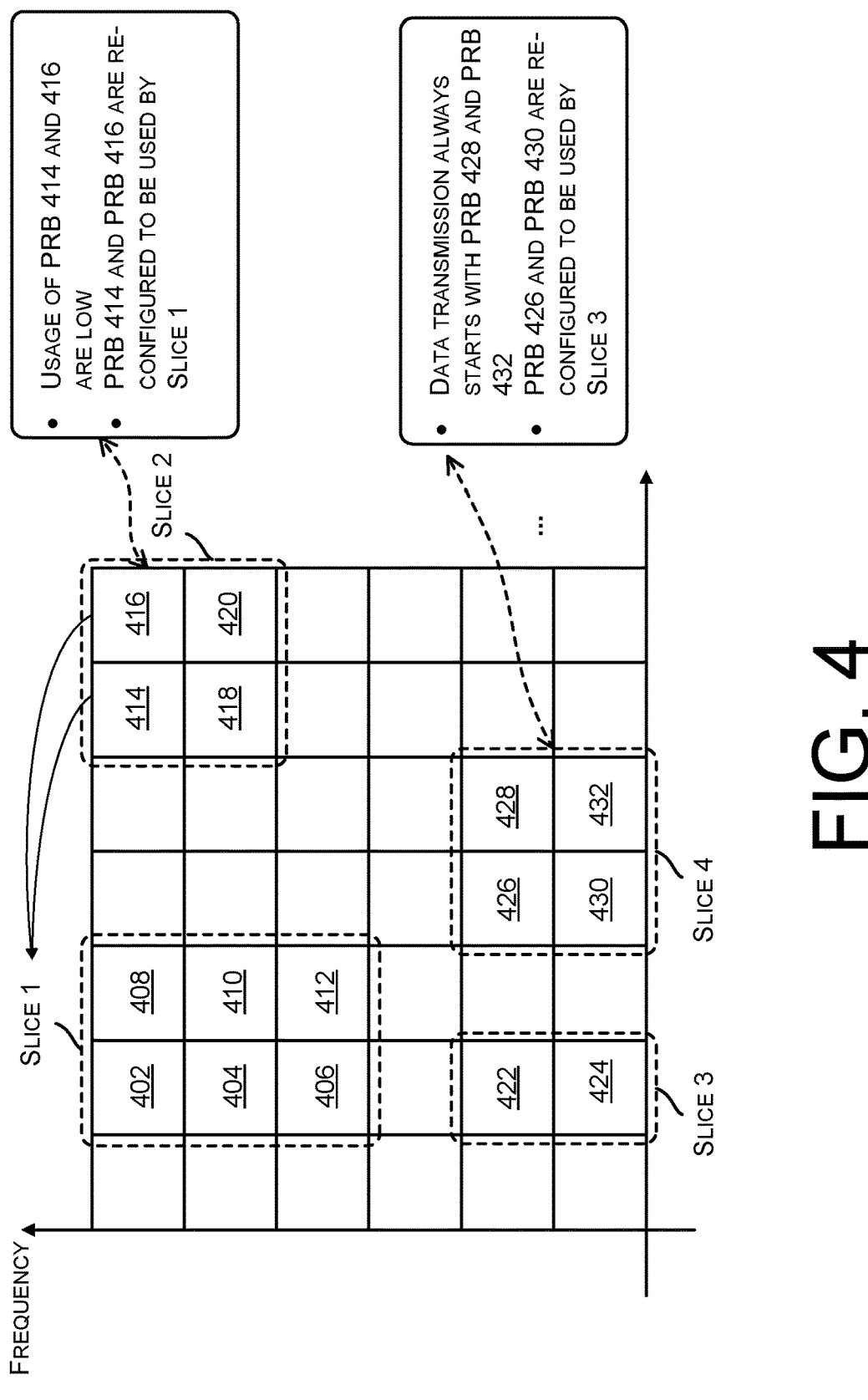
FIG. 4 illustrates an example uplink grant scheduling for user equipment, according to another example of the present disclosure.

FIG. 4 illustrates an example scenario 400 for uplink grant scheduling for user equipment, according to another example of the present disclosure.

The example scenario 400 illustrates an uplink grant scheduling for pre-set services (e.g., Slice 1 corresponding to service 1, Slice 2 corresponding to service 2, Slice 3 corresponding to service 3, and Slice 4 corresponding to service 4).

As illustrated in FIG. 4, PRB 402, PRB 404, PRB 406, PRB 408, PRB 410, and PRB 412 may be pre-granted to Slice 1. PRB 414, PRB 416, PRB 418, and PRB 420 may be pre-granted to Slice 2. PRB 422 and PRB 424 may be pre-granted to Slice 3. PRB 426, PRB 428, PRB 430, and PRB 432 may be pre-granted to Slice 4. In some implementations, after these pre-granted PRBs are allocated to the corresponding slices, the network (e.g., the RAN 112 and/or the resource scheduler 116) may track the usage of each pre-granted PRB (e.g., PRB 402, PRB 404, PRB 406, PRB 408, PRB 410, PRB 412, PRB 414, PRB 416, PRB 418, PRB 420, PRB 422, PRB 424, PRB 426, PRB 428, PRB 430, and PRB 432). In some examples, for each pre-granted PRB, the network may monitor the usage of the pre-granted PRB in an observing time window. In some instances, the observing time window may be a short time period, e.g., any value within one hour, e.g., 5 minutes, 10 minutes, or 30 minutes. If the usage of the pre-granted PRB is low in the observing time window, the network may track the usage of the pre-granted PRB in a time period longer than the observing time window. In some implementations, the time period may be set as one entire day.

In some implementations, for each pre-granted PRB, the network may track the number of resource elements (e.g., RE 212 shown in FIG. 2) used to carry data transmission during the observing time window (e.g., in 10 minutes)

and/or during the time period (e.g., during the day). As illustrated in FIG. 4, PRB 414 and PRB 416 pre-granted to Slice 2 are observed to have low usage during the day. The network may determine that PRB 414 and PRB 416 pre-granted to Slice 2 could be granted to other slices instead (e.g., Slice 1) to transmit data in the uplink. In some examples, a usage threshold may be applied to determine whether the pre-granted PRB re-allocation is recommended.

In some examples, the network may observe hysteresis in implementing a pre-granted PRB for uplink data transmission. For example, the network may observe that data transmission for Slice 4 may always start with PRB 428 and PRB 432, leaving PRB 426 and PRB 430 barely used. If the observed hysteresis continues for one day, the network may determine that PRB 426 and PRB 430 pre-granted to Slice 4 could be granted to other slices instead (e.g., Slice 3) to transmit data in the uplink. Based at least in part on the observed usage pattern (e.g., usage and/or hysteresis) of the pre-granted PRBs, the RAN 112 and/or the resource scheduler 116 may re-allocate the pre-granted PRBs (e.g., PRB 302, PRB 304, PRB 306, PRB 308, PRB 310, and PRB 312 pre-granted to UE 1, PRB 314, PRB 316, PRB 318, and PRB 320 pre-granted to UE2, PRB 322 and PRB 324 pre-granted to UE 3, and PRB 326, PRB 328, PRB 330, and PRB 332 pre-granted to UE 4). In some examples, the re-allocation of the pre-granted PRBs may be implemented during a certain time of the day such that the impact on user experience is minimum (e.g., during nighttime). The RAN 112 and/or the resource scheduler 116 may implement the re-allocated PRBs by flushing the memory associated therewith during the nighttime.

The example scenario 300 and the example scenario 400 illustrate uplink grant scheduling for pre-grouped UE and pre-set services, respectively. It should be appreciated that both example scenarios are for the illustration purposes. The present disclosure is not intended to be limiting. The pre-granted UL resources (e.g., PRBs) not only can be re-allocated among the pre-grouped UE or the pre-set services, but also to other UE and other services. In some instances, additional UL resources may be added to be granted to the pre-grouped UE or the pre-set services.

FIG. 5 illustrate an example process 500 for enhanced uplink grant scheduling for user equipment, according to an example of the present disclosure. The operations described in the example process 500 may be performed by an entity at the radio access network (RAN), e.g., the RAN 112 and/or the resource scheduler 116, as shown in FIG. 1 and FIG. 2

At operation 502, the process may include configuring one or more resource blocks (RBs) for use by a plurality of user equipment (UE) to transmit data from corresponding user equipment (UE) in an uplink according to a schedule. As discussed herein, the plurality of UE may be pre-grouped based at least in part on device characteristics, locations during the work hours, uplink traffic pattern observed in the past, etc. Each of the plurality of UE may be pre-granted with at least one RB to transmit data in the uplink.

At operation 504, the process may include allocating the one or more RBs to the plurality of UE based at least in part on the schedule. In some examples, the schedule may determine the frequency ranges the one or more RBs span in frequency domain and a number of slots that the one or more RBs occupy in time domain.

At operation 506, the process may include determining a usage pattern of a first RB during an observing window, the first RB being allocated to a first UE of the plurality of UE. As discussed herein, the observing window may be set as a short time period such as 5 minutes, 10 minutes, etc. In some examples, the observing window may be set as any time period less than or equal to one hour.

At operation 508, the process may include determining the usage pattern of the first RB during a time period following the observing window. In some examples, when the usage of the first RB during the time period is low, the process may continue to monitor the usage of the first RB for longer time period, e.g., during a day, for a few days, or for one week, etc. In some instances, there can be a hysteresis of using the pre-granted RB in data transmission causing the usage of the pre-granted RB being very low. In some examples, the process may further include determining a number of resource elements (REs) in the first RB that are actually carrying data during the time period.

At operation 510, the process may include determining whether re-allocation is recommended. In some examples, if the usage of the first RB is observed to be low during the time period (e.g., one or more days, an entire week, etc.), a re-allocation of the first RB pre-granted to the first UE is recommended. In some examples, a usage threshold may be implemented to determine whether to recommend a resource re-allocation.

If re-allocation is not recommended, at operation 512, the process may include keeping the configuration of the first RB.

If re-allocation is recommended, at operation 514, the process may include modifying the schedule to re-allocate the first RB to another UE in the plurality of UE. As discussed herein, the re-allocation of the first RB may be implemented during a time period that the impact on user experience is minimum. In some examples, the re-allocation of the first RB may include flushing a memory associated with the RAN and/or the resource scheduler to update the configuration of the first RB.

It should be appreciated that although the example process 500 only describes monitoring the usage pattern of a first RB pre-granted to a first UE, the present disclosure is not intended to be limiting. The process may include monitoring each of the pre-granted RBs for a time period and re-allocating the one or more pre-granted RBs among the plurality of UE. The process may also include adding additional RBs for the use by the pre-grouped UE or removing some pre-granted RBs from being used by the pre-grouped UE.

Figure 6:
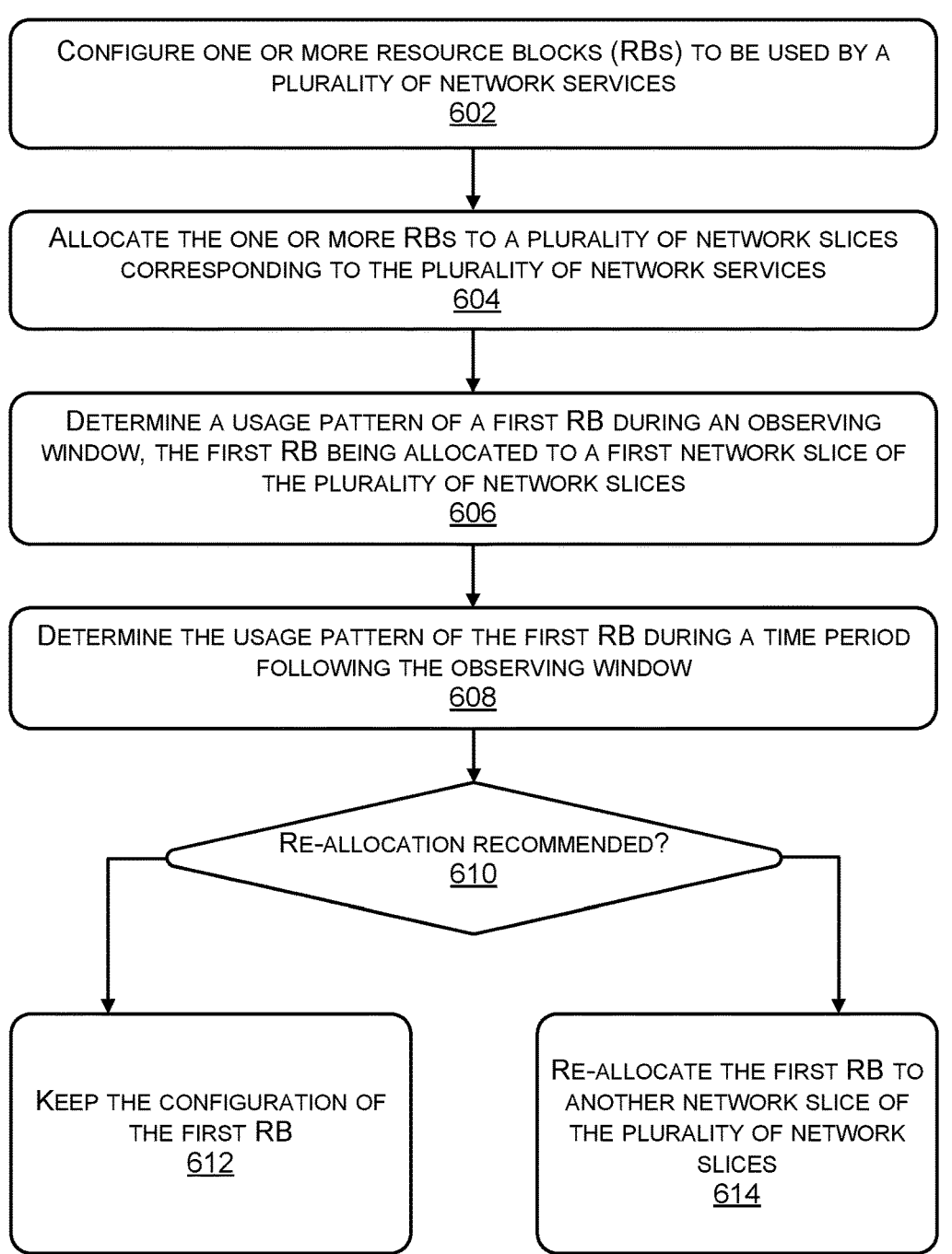
FIG. 6 illustrate an example process for enhanced uplink grant scheduling for user equipment, according to another example of the present disclosure.

FIG. 6 illustrate an example process 600 for enhanced uplink grant scheduling for user equipment, according to another example of the present disclosure.

The operations described in the example process 600 may be performed by an entity at the radio access network (RAN), e.g., the RAN 112 and/or the resource scheduler 116, as shown in FIG. 1 and FIG. 2

At operation 602, the process may include configuring one or more resource blocks (RBs) to be used by a plurality of network services. In some examples, low latency services (e.g., URLLC) may be pre-granted with a number of RBs to secure the data transmission in the uplink. The low latency services may by initiated by a computing device associated with an autonomous vehicle where immediate obstacle classification is desired, a robotics surgery system that instant pathology analysis during the surgery is critical, etc.

At operation 604, the process may include allocating the one or more RBs to the plurality of network slices corresponding to the plurality of network services. In some examples, the RBs allocated to respective network slices may be continuous in frequency domain and/or time domain. In yet other examples, the RBs allocated to respective network slices may not be continuous in frequency domain and/or time domain.

At operation 606, the process may include determining a usage pattern of a first RB during an observing window, the first RB being allocated to a first network slice of the plurality of network slices. In some examples, the observing window may be set as a short time period less than or equal to one hour.

At operation 608, the process may include determining the usage pattern of the first RB during a time period following the observing window. In some examples, when the usage of the first RB during the time period is low, the process may continue to monitor the usage of the first RB for longer time period. In some instances, there can be a hysteresis of using the pre-granted RB in data transmission causing the usage of the pre-granted RB being very low. In some examples, the process may further include determining a number of resource elements (REs) in the first RB that are actually carrying data during the time period.

At operation 610, the process may include determining whether re-allocation is recommended. In some examples, if the usage of the first RB is observed to be low during the time period (e.g., one or more days, an entire week, etc.), a re-allocation of the first RB pre-granted to the first UE is recommended. In some examples, a usage threshold may be implemented to determine whether to recommend a resource re-allocation.

If re-allocation is not recommended, at operation 612, the process may include keeping the configuration of the first RB.

If re-allocation is recommended, at operation 614, the process may include re-allocating the first RB to another network slice in the plurality of network slices. As discussed herein, the re-allocation of the first RB may be implemented during a time period that the impact on user experience is minimum. In some examples, the re-allocation of the first RB may include flushing a memory associated with the RAN and/or the resource scheduler to update the configuration of the first RB.

It should be appreciated that although the example process 600 only describes monitoring the usage pattern of a first RB pre-granted to a first network slice corresponding a first network service, the present disclosure is not intended to be limiting. The process may include monitoring each of the pre-granted RBs for a time period and re-allocating the one or more pre-granted RBs among the plurality of network slices. The re-allocation of the one or more pre-granted RBs may further include adjusting the percentages of the RBs pre-granted to a certain network slice. The process may also include adding additional RBs for the use by a network slice or removing some pre-granted RBs from being used by the network slice.

In some examples, the example process 600 may be a subsequent process of the example process 500. For example, during the example process 500, a second UE may be pre-granted with a second number of RBs, among which, 40% of the second number of RBs are allocated to a network slice carrying URLLC service. The network may track the overall usage of the second number of RBs pre-granted to the second UE and a particular usage of the 40% of the second number of RBs pre-granted to URLLC during the time period. The re-allocation of the uplink resources after the time period may include re-allocation of the RBs pre-granted to the second UE and re-allocation of the percentage of RBs pre-granted to URLLC used by the second UE.

It should also be appreciated that although network slices are used to distinguish various levels of network services, the Quality of Service (QoS) indicators may also be used to distinguish various levels of network services. In some examples, the uplink resources (e.g., RBs) may be pre-granted to various QoS levels of services. The usage of these pre-granted RBs can also be dynamically tracked during a time period. Based on the usage pattern of these pre-granted RBs, the uplink resources can be re-allocated for the various QoS levels of services.

Figure 7:
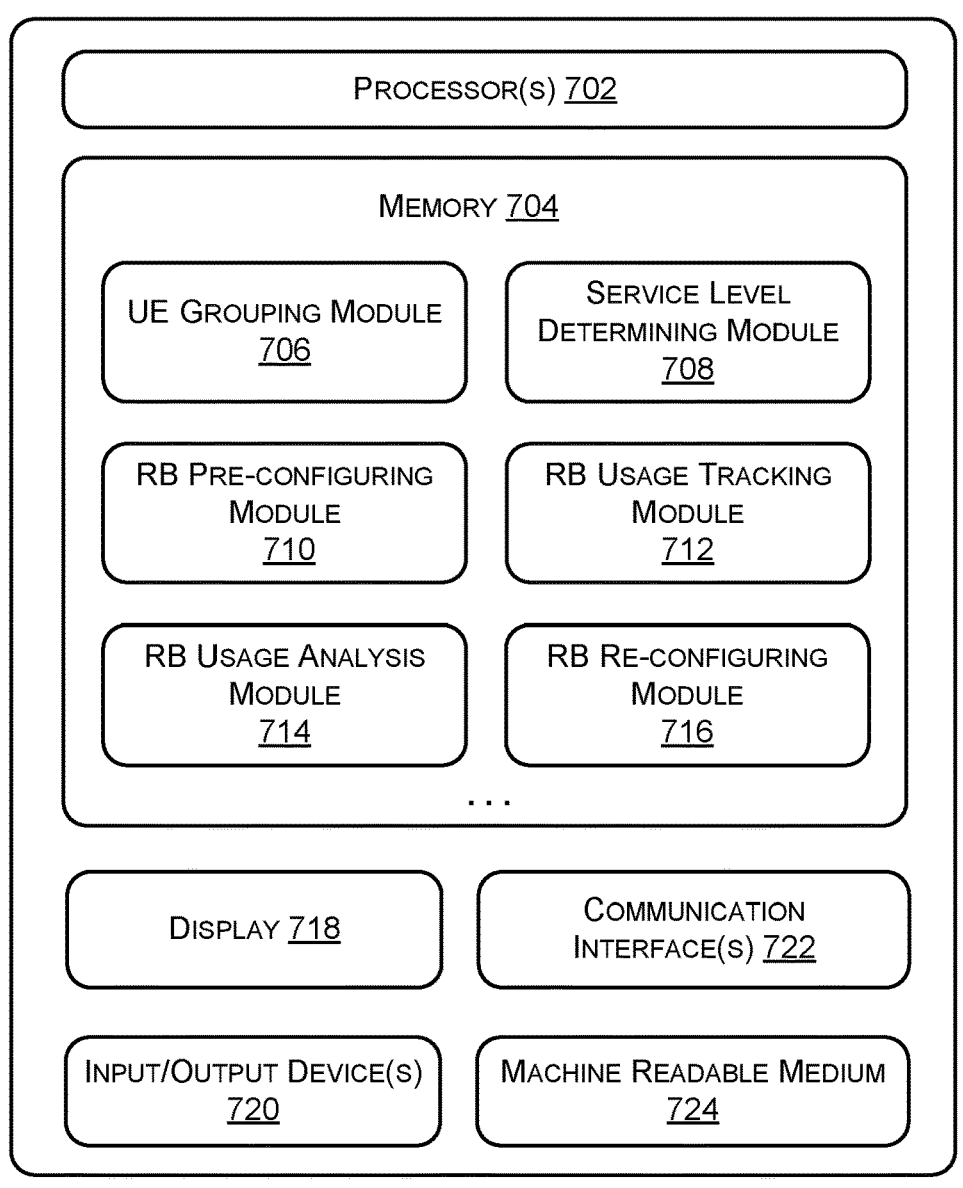
FIG. 7 illustrates an example computer server that implements techniques for enhanced uplink grant scheduling for user equipment, as described herein.

FIG. 7 illustrates an example computer server 700 that implements techniques for enhanced uplink grant scheduling for user equipment, as described herein. The example computer server 700 may be implemented on a network entity, particularly, associated with the radio access network of a wireless communication network. In some examples, the example computer server 700 may be implemented on RAN 112 and/or the resource scheduler 116, as illustrated in FIG. 1.

As illustrated in FIG. 7, the computer server 700 may comprise processor(s) 702, a memory 704 storing a UE grouping module 706, a service level determining module 708, an RB pre-configuring module 710, an RB usage tracking module 712, an RB usage analysis module 714, an RB re-configuring module 716, a display 718, input/output device(s) 720, communication interface(s) 722, and/or a machine readable medium 724.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer server 700. Any such non-transitory computer-readable media may be part of the computer server 700.

The UE grouping module 706 may be configured to group a number of UE for uplink resource pre-granting. The UE grouping module 706 may group the UE based on their device characteristics, location during work hours, uplink traffic pattern observed in the past, etc.

The service level determining module 708 may be configured to determine one or more services that can be beneficial from pre-granted uplink resource (e.g., RBs). In some examples, the service level determining module 708 may determine some Ultra-Reliable Low Latency Communication (URLLC) service such as V2X, V2V, smart power grid, industrial automation IoT, robotics surgery system, etc.

The RB pre-configuring module 710 may be configured to pre-configure a number of RBs to be used by a pre-grouped UE and/or a pre-determined network service, as illustrated in FIGS. 2-4.

The RB usage tracking module 712 may be configured to track the pre-configured RBs during a time period. In some examples, the RB usage tracking module 712 may monitor the usage of the pre-configured RBs for a short period of time such as 5 minutes, 10 minutes, etc. When the usage of the pre-configured RBs is low during the short period of time, the RB usage tracking module 712 may monitor the RB usage for a longer period of time such as one or more days, or a week, etc.

The RB usage analysis module 714 may be configured to analyze the usage of the RB (e.g., the actual resource elements that carry data transmission) and whether the usage of the RB has hysteresis during the time period.

The RB re-configuring module 716 may be configured to re-allocate the pre-configured RBs among the pre-grouped UE and/or the network services based on the observed uplink resource usage pattern during the time period. In some examples, low usage RB pre-granted to a UE may be re-allocated for the use by other UE. In other examples, low usage RB pre-granted to a particular service may be re-allocated for the use by other service. In yet some other examples, the percentages of the RBs pre-granted to various UE and/or various services may be adjusted based on the usage pattern.

The communication interface(s) 722 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 722 can be compatible with multiple radio access technologies, such as 5G radio access technologies and 4G/LTE radio access technologies. Accordingly, the communication interfaces 722 can allow the computer server 700 to connect to the 5G system described herein.

Display 718 can be a liquid crystal display or any other type of display commonly used in the computer server 700. For example, display 718 may be a touch-sensitive display screen and can then also act as an input device or keypad, such as for providing a soft-key keyboard, navigation buttons, or any other type of input. Input/output device(s) 720 can include any sort of output devices known in the art, such as display 718, speakers, a vibrating mechanism, and/or a tactile feedback mechanism. Input/output device(s) 720 can also include ports for one or more peripheral devices, such as headphones, peripheral speakers, and/or a peripheral display. Input/output device(s) 720 can include any sort of input devices known in the art. For example, input/output device(s) 720 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 724 can store one or more sets of instructions, such as software or firmware, that embodies any one or more of the methodologies or functions described herein. The instructions can also reside, completely or at least partially, within the memory 704, processor(s) 702, and/or communication interface(s) 722 during execution thereof by the computer server 700. The memory 704 and the processor(s) 702 also can constitute machine readable media 724.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system for enhancing uplink grant scheduling, the system comprising:
   one or more processors;

a non-transitory computer-readable memory storing computer-executable instructions that, when executed by the one or more processors, cause the system to:
      configure one or more resource blocks (RBs) in a radio frame for use by a plurality of user equipment (UE) to transmit data in an uplink according to a schedule;
      allocate the one or more RBs to the plurality of UE based at least in part on the schedule;
      determine usage of the one or more RBs during a time period; and
      modify the schedule to re-allocate the one or more RBs to the plurality of UE based at least in part on the usage.

2. The system of claim 1, wherein the schedule includes a number of RBs being allocated to a target UE at a target time period.

3. The system of claim 1, wherein the computer-executable instructions, when executed by the one or more processors, further cause the system to:
   determine usage of a first RB is low during the time period, the first RB being allocated to a first UE of the plurality of UEs; and
   modify the schedule to change allocation of the first RB from the first UE to a second UE of the plurality of UEs.

4. The system of claim 3, wherein the computer-executable instructions, when executed by the one or more processors, further cause the system to:
   determine a number of resource elements (REs) in the first RB used to transmit data in the uplink during the time period; and
   determine the usage of the first RB based at least in part on the number of REs used to transmit data during the time period.

5. The system of claim 4, wherein the computer-executable instructions, when executed by the one or more processors, further cause the system to:
   determine a pattern of the number of REs used to transmit data during the time period; and
   determine the usage of the first RB based at least in part on the pattern of the number of REs.

6. The system of claim 5, wherein the pattern of the number of REs indicates a first distribution of the number of REs in a time domain and a second distribution of the number of REs in a frequency domain when the number of REs are used.

7. The system of claim 3, wherein the computer-executable instructions that, when executed by the one or more processors, cause the system further to:
   determine the usage of the first RB is low during an observing time window;
   track the usage of the first RB during the time period following the observing time window; and
   determine that the usage of the first RB during the time period is less than a threshold.

8. A system for enhancing uplink grant scheduling, the system comprising:
   one or more processors;
   a non-transitory computer-readable memory storing computer-executable instructions that, when executed by the one or more processors, cause the system to:
      configure one or more resource blocks (RBs) in a radio frame for use by a user equipment (UE) to transmit data in an uplink according to a schedule;
      allocate the one or more RBs among a plurality of network services based at least in part on the schedule;

determine usage of the one or more RBs during a time period; and modify the schedule to re-allocate the one or more RBs among the plurality of network services based at least in part on the usage.

9. The system of claim 8, wherein the schedule includes respective portions of the one or more RBs being allocated to the plurality of network services.

10. The system of claim 8, wherein the computer-executable instructions, when executed by the one or more processors, further cause the system to:

determine usage of a first portion of the one or more RBs is low during the time period, the first portion of the one or more RBs being allocated to a first network service; and modify the schedule to reduce an amount of the first portion of the one or more RBs allocated to the first network service.

11. The system of claim 10, wherein the computer-executable instructions, when executed by the one or more processors, further cause the system to:

determine the usage of the first portion of the one or more RBs is low during an observing time window;

track the usage of the first portion of the one or more RBs during the time period following the observing time window; and determine that the usage of the first portion of the one or more RBs during the time period is less than a threshold.

12. The system of claim 8, wherein the plurality of network services are carried respectively by a plurality of network slices established between the UE and a network.

13. The system of claim 10, wherein the computer-executable instructions, when executed by the one or more processors, further cause the system to:

determine a number of resource elements (REs) in the first portion of the one or more RBs allocated to a first network slice designed to the first network service during the time period; and determine the usage of the first portion of the one or more RBs based at least in part on the number of REs used to transmit data on the first network slice during the time period.

14. The system of claim 13, wherein the computer-executable instructions, when executed by the one or more processors, further cause the system to:

determine a pattern of the number of REs used to transmit data on the first network slice during the time period; and determine the usage of the first portion of the one or more RBs based at least in part on the pattern of the number of REs, wherein the pattern of the number of REs indicates a first distribution of the number of REs in a time domain and a second distribution of the number of REs in a frequency domain when the number of REs are used.

15. A method comprising:

configuring one or more resource blocks (RBs) in a radio frame for use by a plurality of user equipment (UE) to transmit data in an uplink according to a schedule;

allocating the one or more RBs to the plurality of UE based at least in part on the schedule;

determining usage of the one or more RBs during a time period; and modifying the schedule to re-allocate the one or more RBs to the plurality of UE based at least in part on the usage.

16. The method of claim 15, wherein the schedule includes a number of RBs being allocated to a target UE at a target time period.

17. The method of claim 15, further comprising:

determining usage of a first RB is low during the time period, the first RB being allocated to a first UE of the plurality of UEs; and modifying the schedule to change allocation of the first RB from the first UE to a second UE of the plurality of UEs.

18. The method of claim 17, further comprising:

determining a number of resource elements (REs) in the first RB used to transmit data in the uplink during the time period; and determining the usage of the first RB based at least in part on the number of REs used to transmit data during the time period.

19. The method of claim 18, further comprising:

determining a pattern of the number of REs used to transmit data during the time period; and determining the usage of the first RB based at least in part on the pattern of the number of REs.

20. The method of claim 19, wherein the pattern of the number of REs indicates a first distribution of the number of REs in a time domain and a second distribution of the number of REs in a frequency domain when the number of REs are used.

* * * * *